United States Patent
Tan et al.

(10) Patent No.: US 11,074,414 B2
(45) Date of Patent: *Jul. 27, 2021

(54) DISPLAYING TEXT CLASSIFICATION ANOMALIES PREDICTED BY A TEXT CLASSIFICATION MODEL

(71) Applicant: INTERNATIONAL BUSINESS MACHINES CORPORATION, Armonk, NY (US)

(72) Inventors: Ming Tan, Malden, MA (US); Saloni Potdar, Arlington, MA (US); Lakshminarayanan Krishnamurthy, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 54 days.

This patent is subject to a terminal disclaimer.

(21) Appl. No.: 16/454,773

(22) Filed: Jun. 27, 2019

(65) Prior Publication Data
US 2020/0327194 A1 Oct. 15, 2020

Related U.S. Application Data

(63) Continuation of application No. 16/380,986, filed on Apr. 10, 2019.

(51) Int. Cl.
*G06F 40/289* (2020.01)
*G06F 3/0482* (2013.01)
(Continued)

(52) U.S. Cl.
CPC .......... *G06F 40/289* (2020.01); *G06F 3/0482* (2013.01); *G06F 40/166* (2020.01); *G06K 9/6267* (2013.01)

(58) Field of Classification Search
CPC ....... G06F 40/49; G06F 40/284; G06F 40/289
See application file for complete search history.

(56) References Cited

U.S. PATENT DOCUMENTS 9,594,743 B2   3/2017  Bunin et al.
9,940,323 B2   4/2018  Boyer et al.
(Continued)

FOREIGN PATENT DOCUMENTS

CN   111813928 A   10/2020

OTHER PUBLICATIONS

"List of IBM Patents or Patent Applications Treated as Related", dated Apr. 10, 2019, 2 pages.
(Continued)

*Primary Examiner* — Michael N Opsasnick
(74) *Attorney, Agent, or Firm* — David K. Mattheis; Maeve M. Carpenter

(57) ABSTRACT

A test controller submits testing phrases to a text classifier and receives, from the text classifier, classification labels each comprising one or more respective heatmap values each associated with a separate word. The test controller aligns each of the classification labels corresponding with a respective testing phrase. The test controller identifies one or more anomalies of a selection of one or more classification labels that are different from an expected classification label for the respective testing phrase. The test controller outputs a graphical representation in a user interface of the selection of one or more classification labels and one or more respective testing phrases with visual indicators based on one or more respective heatmap values.

5 Claims, 10 Drawing Sheets

(51) Int. Cl.
  *G06K 9/62* (2006.01)
  *G06F 40/166* (2020.01)

(56) References Cited

U.S. PATENT DOCUMENTS

| | | | | |
|---|---|---|---|---|
| 2008/0156171 | A1* | 7/2008 | Guldi | G09B 15/00 84/466 |
| 2011/0055192 | A1* | 3/2011 | Tang | G06F 16/951 707/706 |
| 2014/0188462 | A1* | 7/2014 | Zadeh | G06N 7/005 704/9 |
| 2014/0337272 | A1* | 11/2014 | Cox | G06F 16/00 706/47 |
| 2014/0358544 | A1* | 12/2014 | Printz | G10L 15/19 704/254 |
| 2014/0379349 | A1* | 12/2014 | Bangalore | G06F 16/3334 704/257 |
| 2015/0012271 | A1* | 1/2015 | Peng | G10L 15/08 704/235 |
| 2015/0019227 | A1* | 1/2015 | Anandarajah | G10L 15/22 704/257 |
| 2015/0066479 | A1* | 3/2015 | Pasupalak | G06F 40/20 704/9 |
| 2015/0073811 | A1* | 3/2015 | Johnston | G06F 40/40 704/275 |
| 2015/0120379 | A1* | 4/2015 | Lee | G06Q 30/02 705/7.29 |
| 2015/0193523 | A1* | 7/2015 | Cox | G06F 16/9027 707/737 |
| 2015/0195406 | A1* | 7/2015 | Dwyer | G06F 21/6254 379/265.07 |
| 2015/0242762 | A1* | 8/2015 | Cox | G06Q 30/0621 706/11 |
| 2015/0255069 | A1* | 9/2015 | Adams | G06F 40/263 704/236 |
| 2015/0269934 | A1* | 9/2015 | Biadsy | G10L 15/197 704/235 |
| 2015/0293602 | A1* | 10/2015 | Kay | G06F 3/023 345/168 |
| 2015/0339292 | A1* | 11/2015 | Barbosa | G06F 40/10 704/9 |
| 2017/0110144 | A1* | 4/2017 | Sharifi | G06F 21/32 |
| 2017/0161390 | A1* | 6/2017 | Kavas | G06F 16/313 |
| 2018/0039990 | A1* | 2/2018 | Lindemann | G06K 9/00892 |
| 2018/0075013 | A1 | 3/2018 | Razack et al. | |
| 2018/0097759 | A1* | 4/2018 | Brechbuhl | G06F 16/24578 |
| 2020/0327193 | A1 | 10/2020 | Tan et al. | |
| 2020/0327381 | A1 | 10/2020 | Tan et al. | |

OTHER PUBLICATIONS

Freund et al., "Experiments with a new boosting algorithm." Icml. vol. 96, 1996, 16 pages.

Srinivas et al., "Biometric recognition for airplane cockpit security," 2016 International Conference on Circuits, Control, Communications, and Computing, Oct. 2016, 5 pages.

Malmasi et al., "Language identification using classifier ensembles," Proceedings of the Joint Workshop on Language Technology for Closely Related Languages, Varieties and Dialects, 2015, 9 pages.

Murawaki, "Global Model for Hierarchical Multi-Label Text Classification," Proceedings of the Sixth International Joint Conference on Natural Language Processing, 2013, 9 pages.

Yusof et al., "Real-time person re-identification for interactive environment," Dissertation, University of Birmingham, Mar. 2016, 221 pages.

Singhal, "Leveraging open source web resources to improve retrieval of low text content items," Dissertation, University of Minnesota, Aug. 2014, 160 pages.

Bandanau et al, "Neural Machine Translation by Jointly Learning to Align and Translate", ICLR 2015, 15 pages.

Santos et al, "Attentive Pooling Networks", arXiv 1602.03609, Feb. 11, 2016, 10 pages.

Parikh et al., "A Decomposable Attention Model for Natural Learning Interference", 2016 Conference on Empirical Methods in Natural Language Processing, pp. 2249-2255, 2016, 7 pages.

Non-final Office Action, dated Nov. 6, 2020, U.S. Appl. No. 16/380,386, filing date Apr. 10, 2019, In re Opsasnick.

"List of IBM Patents or Patent Applications Treated as Related", dated Nov. 5, 2020, 2 pages.

* cited by examiner

| TRAINING GROUND TRUTH 504 | | | | | | | TESTING SET PREDICTION 506 | | | | | | |
|---|---|---|---|---|---|---|---|---|---|---|---|---|---|
| INTENT 510 | CAPABILITIES 512 | | | | | | GREETINGS 514 | | | | | | |
| TEXT 516 | how | are | you | going | to | help | me | ? | how | are you | going | to | help | me | ? |
| COLOR 518 | 2 | 4 | 2 | 3 | 4 | 3 | 2 | 3 | 5 | 2 | 2 | 2 | 0 | 2 |
| | 520 | 521 | 522 | 523 | 524 | 525 | 526 | 530 | 531 | 532 | 533 | 534 | 535 | 536 |

| INTENT 540 | GREETINGS 542 | | | | | THANKS 544 | | | | |
|---|---|---|---|---|---|---|---|---|---|---|
| TEXT 546 | I | am | feeling | good | thanks | I | am | feeling | good | thanks |
| COLOR 548 | 0 | 1 | 3 | 4 | 2 | 1 | 0 | 1 | 2 | 5 |
| | 550 | 551 | 552 | 553 | 554 | 560 | 561 | 562 | 563 | 564 |

| INTENT 570 | PHONE 572 | | | | LOCATION 574 | | | |
|---|---|---|---|---|---|---|---|---|
| TEXT 576 | Dial | the | home | number | Dial | the | home | number |
| COLOR 578 | 4 | 0 | 1 | 3 | 1 | 0 | 5 | 1 |
| | 580 | 581 | 582 | 583 | 590 | 591 | 592 | 593 |

DISPLAYING TEXT CLASSIFICATION ANOMALIES PREDICTED BY A TEXT CLASSIFICATION MODEL

CROSS REFERENCE TO RELATED APPLICATIONS

This application is a continuation of commonly assigned U.S. patent application Ser. No. 16/380,986, filed Apr. 10, 2019, which is hereby incorporated herein by reference.

BACKGROUND

1. Technical Field

One or more embodiments of the invention relate generally to data processing and particularly to displaying text classification anomalies predicted by a text classification model.

2. Description of the Related Art

Machine learning plays a central role in many artificial intelligence (AI) applications. One of the outcomes of the process of training machine learning applications is a data object referred to as a model for use in text classification, which is a parametric representation of the patterns inferred from training data. After a model is created, the model is deployed into one or more environments for use in text classification. At runtime, the model is the core of the machine learning system, based on a structure resulting from hours of development and large amounts of data.

BRIEF SUMMARY

In one embodiment, a method is directed to, submitting, by a computer system, a plurality of testing phrases to a text classifier, each of the testing phrases comprising a plurality of words, the text classifier trained to predict a label for each submitted test phrase, the text classifier trained to calculate a word-level score for the label based on an extracted feature of each respective word within each submitted test phrase and assign a heatmap value to reflect a relative weight of each word-level score. The method is directed to receiving, by the computer system, from the text classifier, a plurality of classification labels each comprising one or more respective heatmap values each associated with a separate word within a separate one of the plurality of testing phrases, each of the one or more respective heatmap values reflecting the respective relative weight of a respective word-level score of a respective extracted feature of the separate word. The method is directed to aligning, by the computer system, each of the plurality of classification labels and one or more respective heat map values with a respective testing phrase of the plurality of testing phrases. The method is directed to accessing, by the computer system, a separate groundtruth heatmap value assessment and expected classification label correlating with each respective testing phrase of the plurality of testing phrases. The method is directed to identifying, by the computer system, one or more anomalies of a selection of one or more classification labels of the plurality of classification labels that are different from the expected classification label for each respective testing phrase from among the plurality of testing phrases. The method is directed to outputting, by the computer system, a graphical representation in a user interface of the selection of one or more classification labels and one or more respective testing phrases with visual indicators based on one or more respective heatmap values by each word in the one or more respective testing phrases to identify the contribution of each word to the respective classification label, as compared with one or more visual indicators at a word-level based on the separate groundtruth heatmap value assessment and expected classification label.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
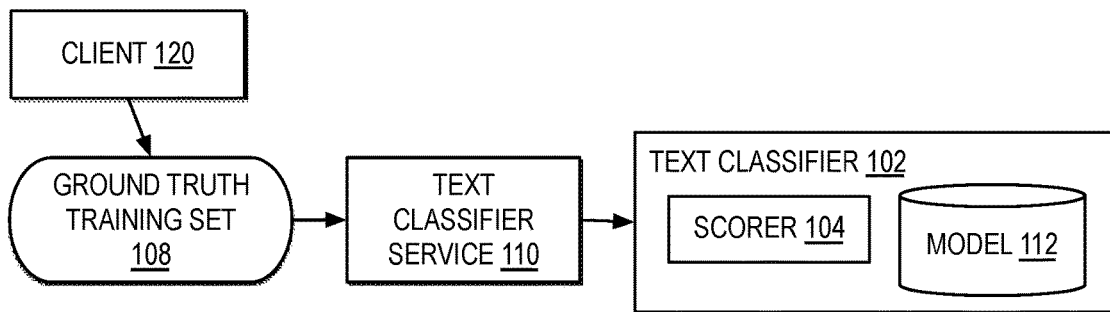
FIG. 1 illustrates one example of a block diagram of a text classifier service for facilitating creation and training of a text classifier for classifying text by labels.

FIG. 1 illustrates a block diagram of a text classifier service for facilitating creation and training of a text classifier for classifying text by labels.

In one example, machine learning plays a central role in artificial intelligence-based applications that interact with one or more natural language processing (NLP) systems. For example, AI based applications may include, but are not limited to, speech recognition, natural language processing, audio recognition, visual scene analysis, email filtering, social network filtering, machine translation, data breaches, optical character recognition, learning to rank, and bioinformatics. In one example, a selection of AI based applications may refer to computer systems, which may operate in one or more types of computing environments, carrying out tasks that require one or more types of text classification analysis. In one example, machine learning may represent one or more types of AI that are based on training a machine with data and algorithms that learn from and make predictions on data. One of the primary outcomes of the process of creating and training a machine learning environment is a data object, referred to as a model, built from sample inputs. In one example, a model 112 represents a data object of a machine learning environment.

In one example, to create and train model 112, a user, such as a client 120, submits an initial training set, such as a ground truth training set 108, to a text classifier service 110. In one example, ground truth training set 108 includes one or more words and multiple-word phrases, each identified with a label from among multiple classification labels identified by the user for training model 112. For example, a user may select labels identifying types of actions, such as "turn on" or "turn off" and assign the labels of "turn on" or "turn off" to each a selection of words or multiple-word phrases that a customer may input as a request for turning on or turning off a service, such as the phrase "add service" labeled with "turn on" and the word "disconnect" labeled with "turn off". In one example, ground truth training set 108 may include one or more commercially available training sets. In another example, ground truth training set 108 may include one or more user-generated training sets, such as a training set of words or phrases collected from chat dialogue records that have been labeled by a user. In another example, ground truth training set 108 may include one or more use-specific automated training sets collected and labeled by an automated training set generation service.

In the example, text classifier service 110 creates an instance of model 112 in a text classifier 102 and trains model 112 by apply ground truth training set 108. Text classifier 102 represents an instance of model 112 combined with a scorer 104 and trained by ground truth training set 108. In one example, model 112 represents a parametric representation of the patterns inferred from ground truth training set 108 during a training process. In one example, text classifier service 110 represents an entity that provides a service for use by clients, such as client 120, for clients to create and train an instance of model 112 in text classifier 102. For example, text classifier service 110 represents a cloud service provider for providing text classifier 102 as a service through one or more applications selected by client 120. In another example, text classifier service 110 represents one or more programming interfaces through which client 120 calls specific functions to create an instance of model 112 in text classifier 102 and calls specific functions to train text classifier 102 based on ground truth training set 108. In additional or alternate embodiments, client 120 may interface with text classifier 102 through additional or alternate interfaces and connections.

In one example, once trained, client 120 may then test text classifier 102 prior to deploying text classifier 120 for access by one or more client applications for providing text classifications services, such as intent classification for dialogue systems, semantic analysis, or document classification. During training and once deployed, a user may submit text to text classifier 102. In response to text submissions, text classifier 102 predicts a classification label for the text and returns the predicted classification label indicating what type of text was received.

In the example, text classifier 102, as trained by ground truth training set 108, may respond to testing submissions with a classification label that is not correctly predicted. In one example, when text classifier 102 makes an incorrect prediction, the incorrect prediction refers to an anomaly in the text classification performed by text classifier 102.

Text classifier service 110 enables client 120 to test text classifier 102 and update ground truth training set 108 for additional training of text classifier 102 to adjust the prediction accuracy of text classifier 102 for use by clients. In particular, client 120 relies on text classifier 102 to provide accurate classifications, however, the accuracy of classification predictions by a particular instance of a model in text classifier 102 may be significantly impacted by the training data distribution in ground truth training set 108 as initially used to train model 112 and also by additional training data submitted by client 120 in response to anomalies detected while testing text classifier 102. Therefore, there is a need for text classifier service 110 to also provide the user with information about text classification anomalies beyond the incorrectly predicted classification label, to enable the user to efficiently and effectively evaluate adjustments to ground truth training set 108 that are likely to train the data pattern in model 112 for text classifier 102 to improve prediction accuracy.

Figure 2:
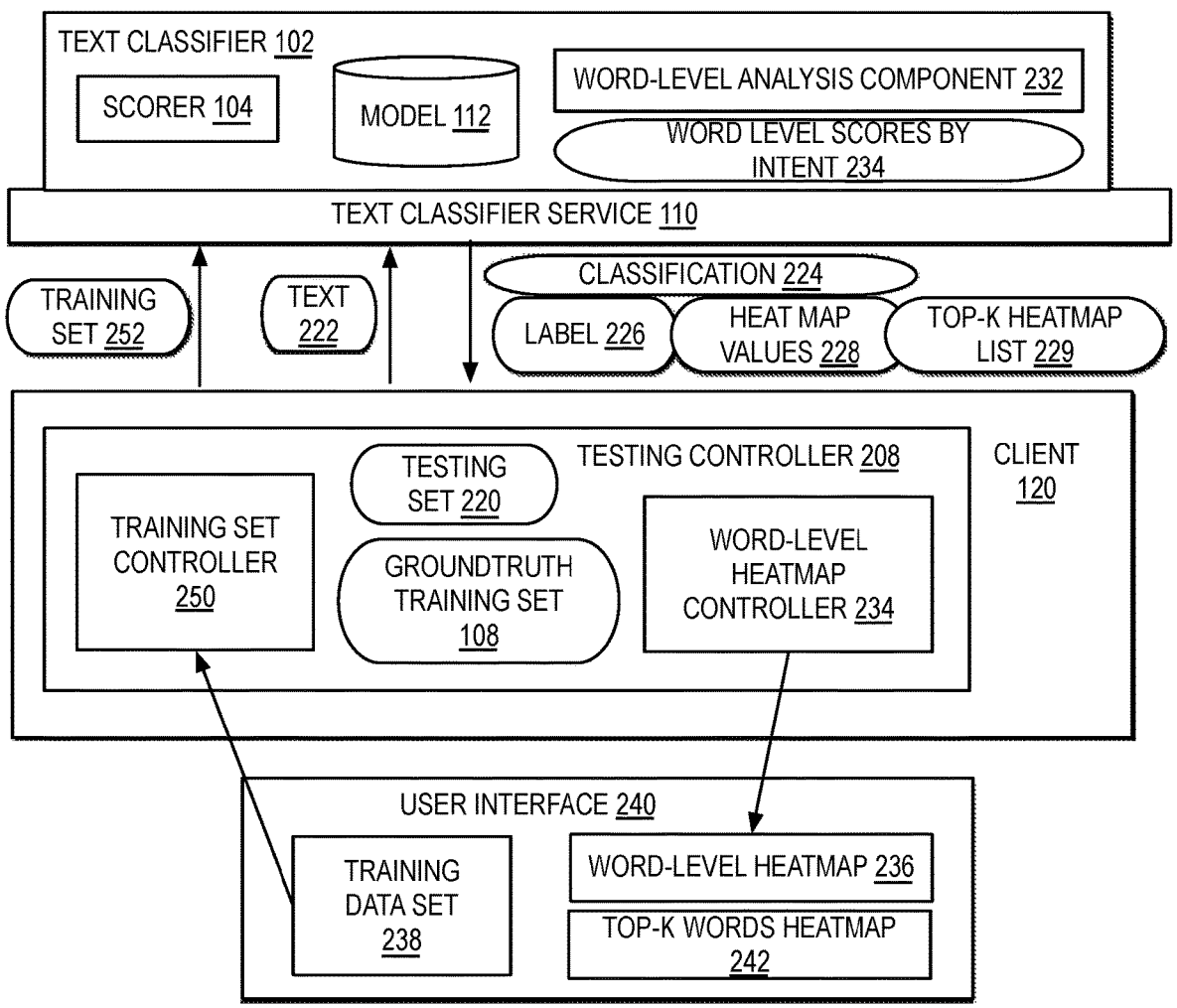
FIG. 2 illustrates one example of a block diagram of a text classifier service for providing information about text classification anomalies predicted by a text classifier during text classifier testing.

FIG. 2 illustrates a block diagram of a text classifier service for providing information about text classification anomalies predicted by a text classifier during text classifier testing.

In one example, during a testing phase, a testing interface of client 120, such as a testing controller 208, submits text 222 to text classifier 102, such as through an application programming interface call to text classifier service 110 or a function call directly to text classifier 102. In the example, text 222 may represent testing samples, of one or more words or phrases, from a testing set 220. In the example, text classifier 102 receives text 222 and classifies text 222, predicting a label classification of text 222.

In the example, the text classification service provided by text classifier 102 refers to a linear classifier process of segmenting text that includes one or more words or other combinations of characters, extracting features of a word or multiple words, assigning a weight for a label to each extracted feature, and combining the weights for the predefined label for the text to identify a score for the label. In one example, text classifier 102 may determine separate scores for each label from among a selection of labels and identify a predicted label from the highest scoring label. In one example, the label may identify one or more types of classifications, such as, but not limited to, an intent of the content of the text. For example, the text classified by text classifier 102 may represent a speech utterance converted into text and the intent label predicted by text classifier 102 may represent the predicted intent of the utterance based on the highest scoring label for the utterance from among multiple scored labels for the utterance.

For example, for classifying text, text classifier 102 implements a scorer 140 that extracts features from words in presented text. Scorer 140 calls a function of model 112 to identify a weight for a label for each extracted feature from text 222. Based on the separately assigned weights of the extracted features, scorer 140 may call functions of model 112 to evaluate a classification for the text overall, such as a particular intent with a percentage probability.

For example, the features extracted by text classifier 102 include, but are not limited to, unigram-based features, bigram-based features, part of speech-based features, term-based features, such as entity-based features or concept-based features, average pooling of word embedding features, and maximum pooling of word embedding features. For example, in a text phrase of "I am a student at [University A]", unigram features may include "I", "am", "student", "at", "University", and "A" and bigram features may include "University A".

For example, text classifier 102 may perform linear classification of text, where the ranking score S of each label I is a weighted sum of the combination of all extracted features, such as based on an equation:

$$S_I(U)=f_1(U)w_{I1}+f_2(U)w_{I2}+\ldots+f_k(U)w_{IK}+b_I,$$

where $U=u_1u_2u_3 \ldots u_N$ is a test example, $u_n$ are the words in the test example, and $f_k(U)$ is an extracted feature. In one example, the extracted features may belong to one or more types of features extracted from certain words or terms inside text. In the example, $w_{IK}$ is the model parameter for the $k^{th}$ feature given the label I. In the example, $b_I$ reflects a contribution from a filler word, such as "BIAS", which reflects an intrinsic preference to an intent without considering any input words.

In one example, text classifier 102 represents a text classification model that may be viewed by client 120 as a black box, where text is applied to text classifier 102 and classification predictions are output from text classifier 102, but the trained data patterns and functions applied by text classifier 102 are not visible to client 120 requesting text classification services from text classifier 102. To protect the underlying data object created in model 112, the entity deploying model 112 may specify one or more layers of protection for allowing use of the functionality of model 112 when deployed, but protecting the trained data patterns of the data object of model 112.

In the example, in response to the submission of text 222 from client 120, text classifier 110 returns classification 224, as determined by text classifier 102. In the example, classification 224 may include a label 226. Label 226 may include a specific classification label and may include additional values, such as, but not limited to, a scoring probability calculated for the classification label. In addition, label 226 may include multiple labels.

In one example, in response to receiving classification 224, testing controller 208 compares label 226 with an expected label for text 222. In one example, testing set 220 includes an expected label for text 222. In one example, if label 226 does not match the expected label for text 222 in testing set 220, testing controller 208 may trigger an output to a user through a user interface 240 to indicate the anomaly.

In one example, based on a detected anomaly, a user may select to adjust a selection of one or more words assigned one or more labels in a training data set 238 within user interface 240. The user may select within user interface 240 to request a training set controller 250 of testing controller 208 send training data set 238 to text classifier 102 for additional training, as illustrated by training set 252, and to update ground truth training set 108 with training data set 238 to maintain a complete training set used to train text classifier 102. In the example, by enabling client 120 to submit additional training data in training data set 138, client 120 may improve the accuracy of the predictions performed by text classifier 102, however, there is a need for supporting the user at user interface 240 to identify what data to include in training data set 238 for training text classifier 102 that is most likely to address anomalies and result in improved accuracy of predictions by text classifier 102.

The accuracy of model 112 in performing text classifications may be a function of the amount of time and resources applied in creating, training, evaluating, and tuning the model, to train text classifier 102 to accurately classify text. In one example, the amount of and distribution of labeled training data used to train model 112 may significantly impact the reliability of model 112 to accurately classify text. While client 120 relies on the accuracy of text classifier 102 as a measure of quality of model 112, the quality and performance of text classifiers may vary widely from model to model and there is not a uniform metric for measuring the quality of a text classifier model or a uniform set of training data publicly available that if used in training a model produces a same accuracy metric.

In addition, when text classifier 102 is implemented as a black box provided by text classifier service 110 and client 120 receives a classification label in classification 224, but the classification label is incorrect, there is a need to provide client 120 with information about why text classifier 102 incorrectly classified a selection of text, without also disclosing the underlying data object in model 112 to client 120, to enable evaluation of what type of training data set is required for potentially increasing the classification accuracy of text classifier 102. For example, if client 120 submits text 222 of a phrase "how are you going to help me?" to text classifier service 110 and receives an incorrect classification of "greeting" when the correct classification should be "capability", there is a need to provide client 120 with information about why text classifier 102 incorrectly classified "how are you going to help me?" as "greeting" instead of "capability".

In particular, there is a need to provide client 120 with information about why text classifier 102 incorrectly classified a selection to text, beyond providing the classification label itself, so that a user monitoring the text classification service received by client 120 may determine additional training data to send to text classifier 102 in training data set 238 that is most likely to train text classifier 102 to correctly classify the selection of text. In particular, it is difficult for a user to attempt to determine the reason for an anomaly from only one or both of the label 226 in classification 224 and the training data sets submitted in training data set 238 by the user because multiple factors combined may cause the classification anomaly. A first factor is that a minor change within training data set 238 and feature tuning may substantially change the classification prediction performed by text classifier 102. In particular, text classifier 102 may be trained to determine the category of a text string based on a large scale of features, such as over 1000 features, internally extracted from training instances, where the features used to train model 112 are transparent to the user and the weights of the features are intrinsically determined by the training procedure applied for training text classifier 102. A second factor is that model 112 may be over-fitted on some unexpected tokens or terms for a particular domain of topics based on the selection of labeled training data used for training model 112 and a limited nature of the selection of labeled training data for the domain. A third factor is that different categories of features may make a specific word's impact on a final decision unclear. For example, some features are lexical-based, such as unigram and bigram, and other features are not lexical-based but are related to lexicons, such as word embeddings and entity types.

For example, considering the second factor, the training strings for the classification intent label of "place an order" may include a high number of occurrences of the term "want to" for other classification intent labels, such that text classifier 120 may incorrectly predict a text input of "I need to delete an order" with the classification label of "place an order" instead of the correct classification label of "delete an order", if the system is partially based on word-level representation features because the words "want" and "need" have similar semantic meanings, but different lexical meanings. Considering the first and third factor, the classification issue is based on a single word, but identifying the particular word in "I need to delete an order" that causes the misclassification may be challenging based on testing results alone and the anomaly may vanish or revive if additional training is performed that adjusts the overall number and type of training utterances that model 112 is trained with, without a user creating the training data identifying the particular word creating the anomaly.

According to an advantage of the present invention, an anomaly visualization service is provided to facilitate user understanding, at a client application level, of the specific words causing text classification anomalies by text classifier 102. In particular, according to an advantage of the present invention, the anomaly visualization service conducts error-analysis of testing sets at the text classifier level and provides visual analysis and cues of information about errors at the application level to assist a user in refining training data set 238 for use in further training of text classifier 102. In one example, the visual analysis and cues may be represented in one or more heatmaps, where the heatmaps apply one or more colors at one or more strengths, where the strength of the color applied to a word indicates the relative weight of the word in contributing to a particular classification label.

While the embodiment described herein refers to a visual heatmap output in a user interface as a graphical representation of data that uses a system of color-coding and weights of the colors to represent different values, in additional or alternate embodiments, the visual heatmap output may be represented in an output interface through other types of outputs that are detectable by a user such as, but not limited to, tactile outputs of the visual indicators in the visual heatmap, audible outputs of the visual indicators in the visual heatmap, and other outputs that enable a user to detect different scoring weights of words. In addition, in additional or alternate embodiments, the visual heatmap output may be represented by graphically represented numerical values, in addition to or in lieu of colors, where the numerical values indicate a percentage or other weighted numerical value.

In one example, the anomaly visualization service includes a word-level analysis component 232 implemented at the classifier level with text classifier 102, a word-level heatmap component 234 implemented at the client application level of client 120, and a word-level heatmap 236, top-k words heatmap 242, and training data set 238 implemented at a user interface level within user interface 240. In additional or alternate embodiments, the anomaly visualization service may include additional or alternate functional and data components.

In one example, word-level analysis component 232 is implemented in the same layer as or incorporated within text classifier 102 for calculating one or more heatmap values for text 222 and for classification labels included in ground truth training set 108. In the example, classification 224 is updated by word-level analysis component 232 with one or more heatmap values determined by word-level analysis component 232 with label 226, illustrated as heatmap values 228. In one example, each heatmap value in heatmap values 228 may represent a one or more weighted values, such as, but not limited to, a percentage and a color, and may identify with or correspond to one or more tokens, such as a word, or may be ordered to correspond to a particular word in a sequence.

For example, word-level analysis component 232 may determine heatmap values 228 by decomposing the scores calculated for each extracted feature into each word or other token and assigning each decomposed score as a heatmap value that directly reflects the word's contribution on the final score of an intent classification. For example, where model 112 is a trained model, all $w_{IK}$ are fixed. As previously described, the linear model applied by model 112 for text classification of text 222, represented as U, uses the weighted summation of various features extracted from the text $f_k(U)$ and then obtains a ranking score S for each label I, such as by:

$$S_I(U) = f_1(U)w_{I1} + f_2(U)w_{I2} + \ldots + f_k(U)w_{IK} + b_I$$

For all types of features used in text classifier 102, word-level analysis component 232 traces back and determines which words contributed to an extracted feature. By accumulating all the feature scores belonging to each token, word-level analysis component 232 decomposes $f_I(U)$ into each word as described by:

$$S_I(U) = S'_I(u_1) + S'_I(u_2) \ldots + S'_I(u_n) + b_I$$

In the example, $S'_I(u_N)$ is used as a heatmap value that directly reflects a word's contribution on the final score of the intent I. In particular, in the example, given a test instance text 222, the summation of the scores of all words on the heatmap are exactly the score that is used to compute the label confidence, therefore, the word-level scores directly reflect the importance of each word in computing the final intent label confidence.

In one example, word-level heatmap controller 234 receives classification 224, with label 226 and heatmap values 228, in response to text 222 and generates a visible, graphical representation of the heatmap values for text 222 in word-level heatmap 236. In one example, word-level heatmap controller 234 applies each percentage or color value in heatmap values 228 sequentially to the words or other tokens identified in text 222. In one example, word-level heatmap 236 may reflect different heatmap values through different colors assigned to different heatmap values, through different shades of a color assigned to different percentages in heatmap values, and through other visually discernable output indicators assigned to different heatmap values. In another example, word-level heatmap 236 may reflect different heatmap values through other types of output interfaces, including, but not limited to, audio and tactile interfaces for adjusting levels or types of outputs to identify different heatmap values.

In one embodiment, word-level heatmap 236 is described with reference to an advantage of the present invention of illustrating the relatedness of each word or other token in a textual sequence with predicted label 226. In another embodiment, word-level heatmap 236 may include visual indicators of additional types of relatedness, such as visualizing the relatedness of each word or other token in a textual sequence for a groundtruth label in comparison to the relatedness of each word or token in a textual sequence for a predicted label. In particular, in the example, word-level heatmap controller 234 may access a groundtruth heatmap of a sentence related to text 222 and an expected label for the sentence and output word-level heatmap 236 with a visually represented comparison of the groundtruth heatmap in comparison with the heatmap generated for text 222 and predicted label 226 based on heatmap values 228. In one example, text classifier 102 may provide the groundtruth heatmap values in classification 224. In another example, testing controller 208 may store heatmaps generated from classification 224 in response to text 222 including groundtruth training set 108. In addition, testing set 220 may include user-generated groundtruth heatmaps.

In one example, word-level heatmap controller 208 initially generates, based on analyzing values in word-level heatmap 236, one or more labels and one or more words in training data set 238. In one example, a user may manually adjust entries in training data set 238 based on inspecting word-level heatmap 236 and request for training set controller 250 to send training data set 238 to train text classifier 102. In one example, training set controller 250 also updates groundtruth training set 108 with training data set 238, to reflect the training data currently used to train model 112 in text classifier 102.

In one example, in addition to analyzing the words in text 222, word-level analysis component 232 analyzes the weight of each word under each label identified with respect to an intent tested by testing set 220. For example, word-level analysis component 232 stores sums of word-level scores identified for each word in each intent predicted for testing set 220 in word level scores by intent 234. Word-level analysis component 232 identifies, for a particular intent, a top-k selection of important words for a particular intent label based on the top-k scoring words sequentially ordered for a particular intent from among word-level scores by intent 234, where k may be set to any value, such as "10". Word-level analysis component 232 returns the ordered top-k selection of important words for a particular intent label 226 in top-k heatmap list 229 with a sequentially ordered list of the top-k scoring words. In addition, top-k heatmap list 229 may include heatmap value, such as a percentage or color, assigned to each word in the sequentially ordered list indicating a relative score of each word to other words and in relation to the predicted intent.

In the example, in response to receiving label 226 with top-k heatmap list 229, word-level heatmap controller 234 generates a top-k words heatmap 242, outputting label 226 and the top-k list and visually highlighting each of the words in the top-k list with heatmap attributes, such as a color and a percentage shading of the color, to visually indicate the relative score of each word in relation to the predicted intent. According to an advantage of the present invention, top-k words heatmap 242 provides a visual representation of the weight of words that are trained for a predicted intent to assist the user in visually assessing whether there are words in the top-k words for the predicted intent label that should be ranked higher or lower for the predicted intent label. Further, top-k words heatmap 242 provides a visual representation of the weight of words that are trained for an expected intent to assist the user in visually assessing whether there are words in the top-k words for the expected intent label that should be ranked higher or lower. Within the interface providing a visual representation of the weight of the words that are trained for an incorrectly predicted intent and an expected intent in top-k heatmap 242, the user is also provided with an interface in which to selectively modify training data set 238 to increase or decrease words assigned to the predicted intent label and the expected intent label.

According to an advantage of the invention, word-level heatmap 236 and top-k words heatmap 242 together provide a user with visual representations of particular words and their semantic equivalents that most likely caused an anomaly, to facilitate user selections within training data set 238 that are most likely to train text classifier 102 to improve prediction accuracy. For example, word-level heatmap 236 visually identifies one or more words that had the highest contribution to a predicted intent in a testing string, to cue a user to the problematic words in an incorrectly predicted testing string that require additional training, and top-k words heatmap 242 visually identifies responding semantic related words associated with the incorrectly predicted label and the expected label, to cue a user to the weighting of the problematic word in the incorrectly predicted label training and the expected label training that require additional training.

According to an advantage of the present invention, through word-level heat-map visualization provided through heatmap values 228 and top-k heatmap list 229, the anomaly visualization service provided through functionality and visual representations provided through word-level analysis component 232, word-level heatmap controller 234, word-level heatmap 236, and top-k words heatmap 242, minimizes the time and effort for a user of text classifier 102 to understand at a word-level why text classifier 102 generates a particular label for a particular testing phrase and which words of a testing phrase most contributed to the text classification decision, without disclosing the underlying data object of model 112. In the example, a user may review a visualization of the scoring of particular words within text 222 that contributed to a label classification in word-level heat-map 236 and efficiently determine which words or terms are more related to each label for a testing phrase and whether the relationship is correct or reasonable, to determine which words require additional training. In addition, in the example, a user may review a visualization of the scoring order of words related to a particular label in top-k words heatmap 242 across multiple testing phrases to determine whether there are words contributing to the scoring of the particular label that need to be adjusted.

In one embodiment, text classifier 102 represents a linear classifier with arbitrary features, such as, but not limited to linear support vector machine (SVM), logistic regression, and perception. In another embodiment, text classifier 102 may implement a more complex model, such as a deep learning model, however, according to an advantage of the present invention, the functionality of the anomaly visualization service does not require the more complex model environment of a deep learning model, but is applicable by detecting the multiple weights applied to different tokens in a text string by linear classifiers. In addition, in one embodiment, text classifier 102 represents a linear classifier that determines scores based on the sum of the individually weighted scores of extracted features and word-level analysis component 232 is described with respect to directly decomposing the extracted feature scores that determine a final label prediction to describe how each word or phrase in text influences the final label output, however, in additional or alternate embodiments, model 112 may also learn additional attention variables that are produced as auxiliary data that may or may not influence a final label prediction score.

Figure 3:
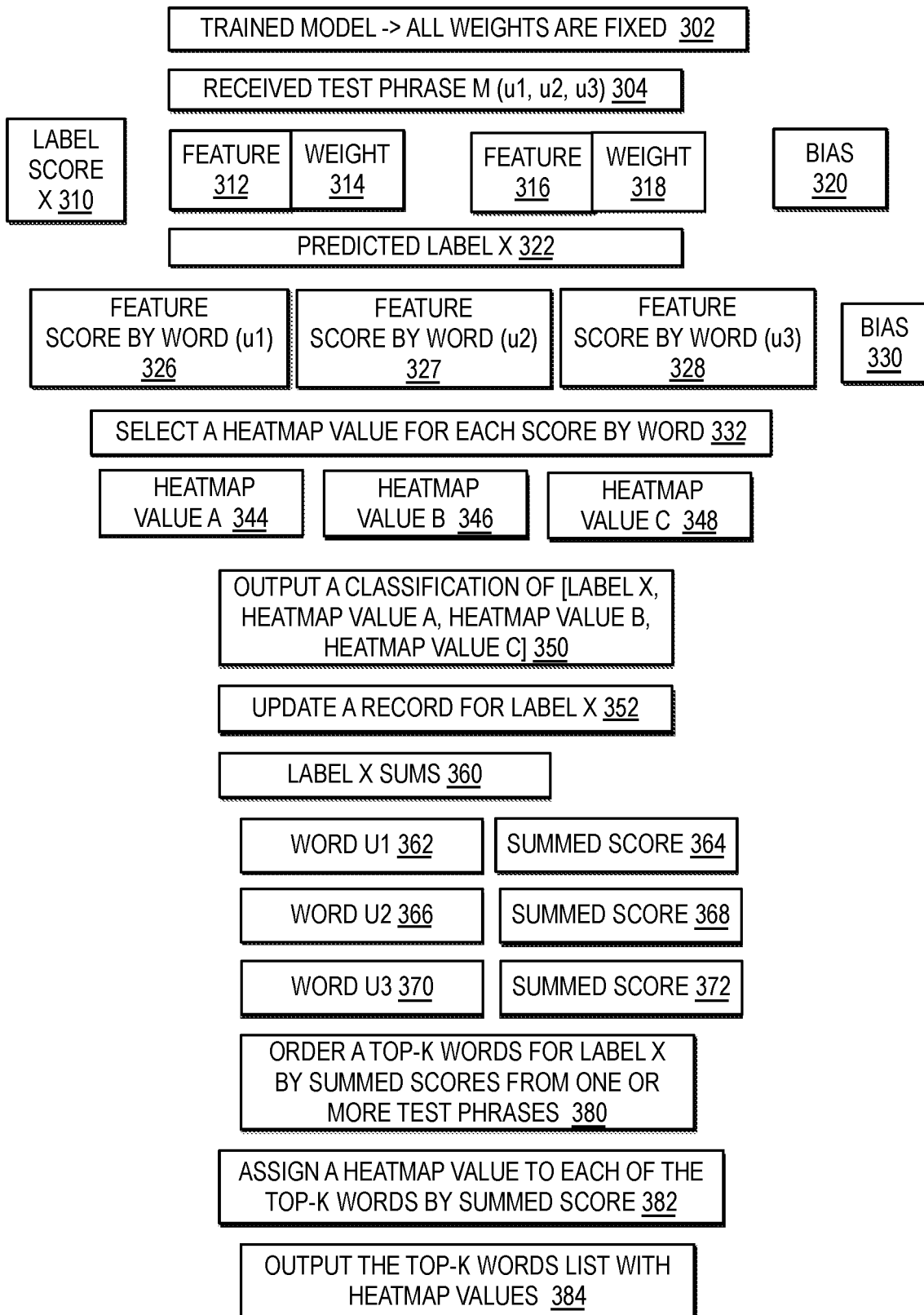
FIG. 3 illustrates one example of word-level analysis elements evaluated by a word level analysis component at a text classifier level.

FIG. 3 illustrates a block diagram of one example of word-level analysis elements evaluated by a word level analysis component at a text classifier level.

In the example, as illustrated at reference numeral 302, for a trained text classifier model, all weights are fixed. In one example, in response to a text phrase M with three words u1, u2, and u3, as illustrated at reference numeral 304, text classifier 102 classifies text phrase M by a predicted label X, as illustrated at reference numeral 322. In the example, words u1, u2, and u3 may each represent a single word or a phrase with multiple words. In one example, each of words u1, u2, and u3 may each be referred to as a token.

In the example, to determine a label score 310 for predicted label X, text classifier 102 sums the weighted score for each extracted feature. For example, label score X 310 is the sum of the product of an extracted feature 312 and a weight 314, the product of an extracted feature 316 and a weight 318, and a bias 320. In one example, text classifier 102 may extract a same number of features from a test phrase as the number of words or may extract fewer or more features from a test phrase than the number of words.

In the example, word-level analysis component 232 decomposes the extracted feature products used to calculate label score X 310 to determine a feature score by word with bias 330 that sums to label score X 310, illustrated by feature score by word (u1) 326, feature score by word (u2) 327, and feature score by word (u3) 328. For example, in decomposing the extracted feature products, word-level analysis component 232 may determine a sum of $S_I(U)$ to recover an original classification score through $$S_I(U) = \sum_{i=0}^{|F|} u_{Ii} f_{Ii}(U) = \sum_{i=0}^{|F|} s_{Ii}(U) = \sum_{i=0}^{|F|} s_{Ii}(w)$$

where I represents an intent label, i represents an extracted feature index, u represent a feature weight, and w is the contributing token of each feature. For multi-token features, the score to each token is split evenly.

In the example, word-level analysis component 232 selects a heatmap value for each score by word, as illustrated at reference numeral 332. For example, word-level analysis component 232 assigns a heatmap value A 344 to feature score by word (u1) 325, a heatmap value B 346 to feature score by word (u2) 327, and a heatmap value C 348 to feature score by word (u3) 328. In the example, word-level analysis 232 outputs a classification with a label X and heatmap value A, heatmap value B, and heatmap value C, as illustrated at reference numeral 350, where the sequential order of heatmap values in the classification correspond to the order of words u1, u2, and u3 in test phrase M.

In the example, for each testing phrase in testing set 220, word-level analysis component 232 updates a record for label X in word level scores by intent 234 as illustrated by label X sums 360. In the example, label X sums 360 includes each word contributing to label X and a summed score across the scores for predicted intents for testing set 220 of summed score 364 for word U1 362, summed score 368 for word U2 366, and summed score 372 for word U3 370. In the example, word level scores by intent 234 includes a record for each intent label detected for the testing phrases in testing set 220.

In the example, based on label X sums 360 across multiple test phrases in testing set 220, as illustrated at reference numeral 380, word-level analysis component 232 orders a top-k words for label X by summed scores from one or more test phrases. Next, as illustrated at reference numeral 382, word-level analysis component 232 assigns a heatmap value to each of the top-k words by summed score 382, and, as illustrated at reference numeral 384, word-level analysis component 232 outputs the top-k word list with heatmap values.

Figure 4:
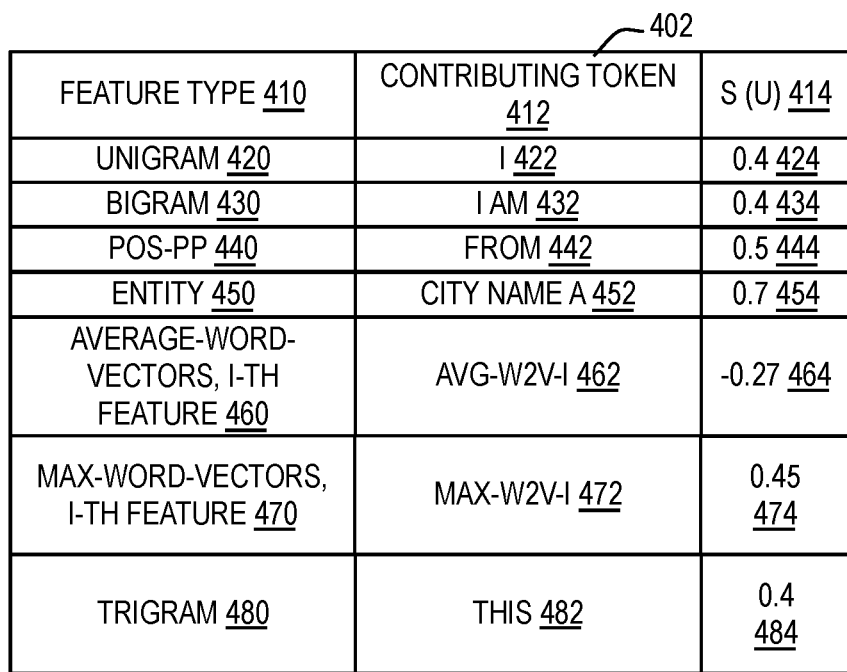
FIG. 4 illustrates one example of a table illustrating examples of types of extracted features which are decomposed for determining feature scores by word.

FIG. 4 illustrates one example of a table illustrating examples of types of extracted features which are decomposed for determining feature scores by word.

In one example, text classifier 102 may support multiple types of feature extraction from among any type of feature that can be decomposed to words. In one example, text classifier 102 supports word-level features, such as unigram and part of speech (POS). In another example, text classifier 102 supports term features, such as entity-based features, concept and term-based features, bigram features and trigram features. In another example, text classifier 102 supports letter-level n-gram features. In addition, text classifier 102 supports max(average) pooling of word embedding features or pre-trained CNN or biLSTM features.

In the example, a table 402 illustrates examples of feature types extracted from a text string, the token applied for a feature type, and an example of a score determined for the token. For example, table 402 includes a column identifying a feature type 410, a column identifying a contributing token 412, and a column identifying a score S(U) 414.

In a first example in table 402, for a feature type of unigram 420, a contributing token identified is "I" 422, and a score is assigned of "0.4" 424. In one example, a feature score by word $S'_I(u_N)$ from feature $f_k(U)$ for the feature type of unigram 420 may be decomposed as a function of:

$$S'_I(u_N) = S'_I(u_N) + f_k(U) w_{IK}.$$

In a second example in table 402, for a feature type of bigram 430, a contributing token identifier is "I am", and a score is assigned of "0.4" 434, which is the same score assigned to token "I" 422. In one example, a feature score by word $S'_I(u_N)$ from feature $f_k(U)$ for the feature type of bigram 430, and for any term-based, multiple word, features may be calculated as a function of:

$$S'_I(u_N) = S'_I(u_N) + f_k(U) w_{IK}/|L|.$$

In one example, L is the length of the term, such that the score of the feature is evenly separated into each word in the term. For example, the length of "I am" is "2", such that the feature product score for extracted feature "I am" is evenly separated in "I" and "am".

In a third example in table 402, for a feature type of part of speech POS-PP 440, a contributing token identifier is "from", and a score is assigned of "0.5" 444, which is a higher score than what is assigned to the token "I" 422 and the token "I am" 424. In one example, a feature score by word $S'_I(u_N)$ from feature $f_k(U)$ for the feature type of part of speech prepositional phrase (POS-PP) 440 may be determined by using a POS tagger to label the POS tag for each word and then treating a specific POS tag as a feature, which is contributed by a specific word.

In a fourth example in table 402, for a feature type of entity 450, a contributing token identifier is "city name A" 452, where "city name A" may identify a particular city name, and a score is assigned of "0.7" 454, which is a higher score than what is assigned to the previous tokens. In one example, a feature score by word $S'_I(u_N)$ from feature $f_k(U)$ for the feature type of entity 450, and for any other entity-based or concept-based, multiple word, features may be calculated as a function of:

$$S'_I(u_N)=S'_I(u_N)+f_k(U)w_{IK}/|L|.$$

In a fifth example in table 402, for a feature type or dimension of average-word-vectors 460, a contributing token identifier is "avg-w2v-I" 462, which represents the average vector of all the word vectors of the words in the sentence, where the average vectors have numeral values. For example, for deep learning, a set of word vectors for vocabulary words can be pretrained by a large corpus, such as a wiki corpus, and used as fixed input vectors for each vocabular word. In the example, a score is assigned of "−0.27" 464, which is a lower score than what is assigned to the previous tokens. In one example, a feature score by word $S'_I(u_N)$ from feature $f_k(U)$ for the feature type of average-word-vectors 460 may be calculated as a function of the average pooling of wording embedding features of all $u_N$, with the feature's score allocated proportionally back to each word in the sequence, according to each word's values on that embedding dimension. Then, the average of word vectors of each word in the sentence is used to obtain a type of sentence-level feature.

In a sixty example in table 402, for a feature type of max-word-vectors 470, a contributing token identifier is "max-w2v-I" 472, and a score is assigned of "0.45" 474. In one example, a feature score by word $S'_I(u_N)$ from feature $f_k(U)$ for the feature type of max-word-vectors 470 may be calculated as a function of the maximum value of wording embedding features of all $u_N$, with the feature's score allocated back only to one word $u_N$, which has the maximum value on that embedding dimension.

In a seventh example, in table 402, for a feature type of character/letter-level features, such as letter-trigrams 480, a contributing token identifier is "from" 482, and a score is assigned of "0.4" 484. In the example, the word $u_N$ "this", has two letter-trigram features of "thi" and "his", with each feature including three sequential characters from the word $u_N$. In one example, a feature score by word $S'_I(u_N)$ from feature $f_k(U)$ for the feature type of letter-trigrams 480 may be calculated as a function of:

$$S'_I(u_N)=S'_I(u_N)+f_k(\text{tri}_1)w_{IK}+f_{k'}(\text{tri}_1)w_{IK'}.$$

In the example, k and k' may represent the first and second two letter trigrams, respectively.

Figures 5, 6:
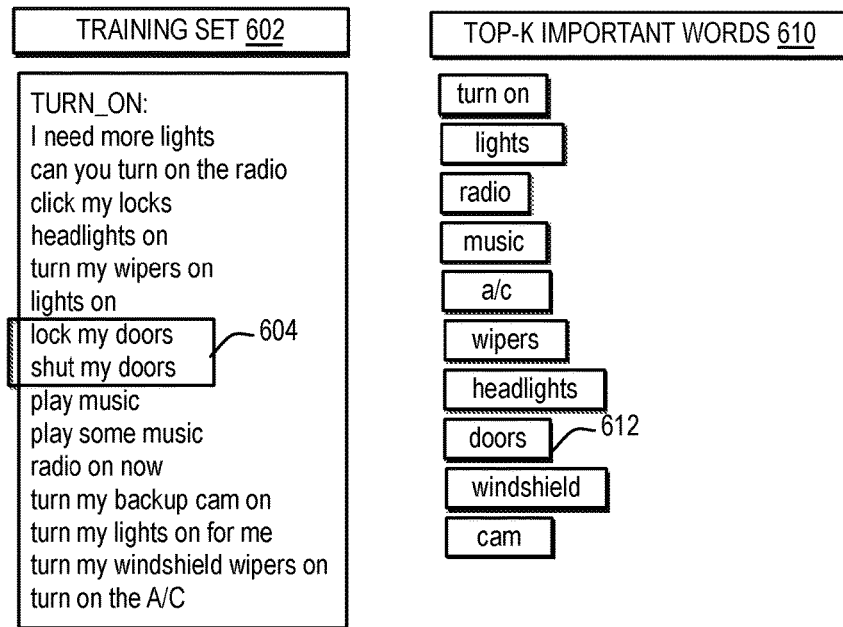
FIG. 5 illustrates one example of a word-level heatmap reflecting a ground truth heatmap in comparison with a testing set heatmap based on testing phrases tested on a trained model.
FIG. 6 illustrates one example of a block diagram of a word-level heatmap reflecting a heatmap of the top-K important words for a label based on testing phrases tested on a trained model.

FIG. 5 illustrates a block diagram of one example of a word-level heatmap reflecting a ground truth heatmap in comparison with a testing set heatmap based on testing phrases tested on a trained model.

In one example, word-level heatmap 236 is illustrated for a selection of testing phrases from testing set 220 as classified by model 112. In the example, for purposes of illustration, FIG. 5 reflects the results of testing three test phrases included in testing set 220. In additional or alternate examples, testing set 220 may include additional volumes of test phrases.

In a first example in FIG. 5, a same test phrase illustrated under text 516 of "how are you going to help me?" is visualized in word-level heatmap 236 for a training ground truth 504 and a testing set prediction 506. In the example, an intent label 510 is identified for the same test phrase under training ground truth 504 as "capabilities" 512 and under testing set prediction 506 as "greetings" 514. In the example, testing set prediction 506 indicates the currently predicted label by text classifier 102 for the test phrase of "how are you going to help me?" from testing set 220. For example, word-level analysis component 232 determines a classification label of "capabilities" and heatmap values for the words in text 516 and outputs the label and heatmap values in classification 224.

Word-level heatmap controller 234 visually identifies, such as by percentage color levels, the percentage probability for each word token identified in text 516 based on the heatmap values returned in classification 224. For purposes of illustration, in the example, the color percentages illustrated for color 518 are illustrated by a color intensity number on a scale of 0 to 5, with each number in the scale reflecting a different shade of color or a different color that may be applied to each of the tokenized portions of the text phrase. In the example, a "0" in color 518 may reflect no color shade and a "5" in color levels 518 may reflect a shading of 100% of a color.

For example, for text 516, the ground truth intent label of "capabilities" 512 is illustrated as visibly impacted by the words "you" and "help" reflecting a highest intensity of "4", where the words "you" and "help" are more indicative of a capability than a greeting. In contrast, the prediction intent of "greetings" 514 is illustrated as visibly impacted by the words "are you" reflecting a highest shading of "5" and the preceding word "how" reflecting a next highest shading of "3", where the words "how" and "are you" are more indicative of a greeting than a capability. In the example, by visibly illustrating the token scoring as a heatmap for a training ground truth and a testing set prediction, the user can visually understand that the current system gives a stronger preference to the term "are you" instead of "help me". In the example, the token of "help me" is intuitively related to how the customer service solves the asker's problem, related to the intent "capabilities", rather than the customer choosing to greet the customer service system. In the example, by visibly illustrating the token scoring as a heatmap for a prediction, the user may select to adjust training data set 238 to include additional training for the phrase "how are you going to help me?", to increase the token scoring for "help", and also for other semantic equivalents such as "helped" and "helps", in the same text phrase as "are you" for the intent of "capabilities". In addition, in the example, for the anomalies in the testing of "how are you going to help me?", the user may selectively adjust training data set 238 to decrease the occurrences of phrases "are you" when present with "help" in the wrongly-predicted intent of "greetings" and increase their occurrence in the training ground truth intent of "capabilities".

In a second example in FIG. 5, a same test phrase illustrated under text 546 of "I am feeling good thanks" is visualized in word-level heatmap 236 for training ground truth 504 and a testing set prediction 506. In the example, an intent label 540 is identified for the same test phrase under training ground truth 504 as "greetings" 542 and under testing set prediction 506 as "thanks" 544. In the example, word-level heatmap controller 234 visually identifies, such as by percentage color levels, the percentage probability for each word token identified in text 546 based on the heatmap values returned in classification 224. For example, for text 546, the ground truth intent label of "greetings" 542 is illustrated as visibly impacted by the words "feeling" and "good" reflecting intensities of "3" and "4", where the words "feeling" and "good" are more indicative of a greeting than a thanks. In contrast, the prediction intent of "thanks" 544 is illustrated as visibly impacted by the word "thanks" reflecting a highest shading of "5", where the word "thanks" is more indicative of a thanks than a greeting. In the example, by visibly illustrating the token scoring as a heatmap for a training ground truth and a testing set prediction, the user can visually understand that the current system gives a stronger preference to the term "thanks" instead of "feeling good". In the example, the token of "feeling good" is intuitively related to how the customer greets the customer service, related to the intent "greetings", rather than the customer choosing to thank the customer service system. In the example, by visibly illustrating the token scoring as a heatmap for a prediction, the user may select to adjust training data set 238 to include additional training for the phrase "I am feeling good thanks", to increase the token scoring for "feeling" and "good", and also for other semantic equivalents such as "doing" and "well", in the same text phrase as "thanks" for the intent of "greetings". In addition, in the example, for the anomalies in the testing of "I am feeling good thanks", the user may selectively adjust training data set 238 to decrease the occurrences of phrases "thanks" when present with "feeling" and "good" in the wrongly-predicted intent of "thanks" and increase their occurrence in the training ground truth intent of "greetings".

In a third example in FIG. 5, a same test phrase illustrated under text 576 of "Dial the home number" is visualized in word-level heatmap 236 for training truth 504 and testing set prediction 506. In the example, an intent label 570 is identified for the same test phrase under training ground truth 504 as "phone" 572 and under testing set prediction 506 as "location" 574. In the example, word-level heatmap controller 234 visually identifies, such as by percentage color levels, the percentage probability for each word token identified in text 576 based on the heatmap values returned in classification 224. For example, for text 576, the ground truth intent label of "phone" 572 is illustrated as visibly impacted by the words "dial" and "number" reflecting intensities of "4" and "3", where the words "dial" and "number" are more indicative of a phone command than a location command. In contrast, the prediction intent of "location" 574 is illustrated as visibly impacted by the word "home" reflecting a highest shading of "5", where the word "home" is more indicative of a location command than a phone command. In the example, by visibly illustrating the token scoring as a heatmap for a training ground truth and a testing set prediction, the user can visually understand that the current system gives a stronger preference to the term "home" instead of "dial" and "number". In the example, the tokens of "dial" and "number" is intuitively related to how the customer requests a phone related service, related to the intent "phone", rather than the customer choosing a location. In the example, by visibly illustrating the token scoring as a heatmap for a prediction, the user may select to adjust training data set 238 to include additional training for the phrase "Dial the home number", to increase the token scoring for "dial" and "number" in the same text phrase as "home" for the intent of "phone". In addition, in the example, for the anomalies in the testing of "Dial the home number", the user may selectively adjust training data set 238 to decrease the occurrences of phrases "home" when present with "dial" and "number" in the wrongly-predicted intent of "location" and increase their occurrence in the ground truth intent of "phone".

FIG. 6 illustrates a block diagram of one example of a word-level heatmap reflecting a heatmap of the top-K important words for a label based on testing phrases tested on a trained model.

In one example, a training set 602 reflects current training data for training model 112 for an intent of "turn_on". For example, training set 602 includes the phrases "I need more lights", "can you turn on the radio", "click my locks", "headlights on", "turn my wipers on", "lights on", "lock my doors", "shut my doors", "play music", "play some music", "radio on now", "turn my backup cam on", "turn my lights on for me", "turn my windshield wipers on", and "turn on the A/C". In the example, top-K important words 610 illustrates a list of words reflected in training set 302, ordered according to importance in predicting the intent "turn_on". In the example, top-K important words 610 are illustrated in an order of importance with the phrase "turn on" listed first as most important and the word "cam" listed last as least important. In the example, the ordering of top-K important words 610 is determined by word-level analysis component 232 detecting word level scores by intent 234 while testing text classifier 102 against testing set 220. In particular, word-level analysis component 232 may sum up the scores computed for heatmap values with respect to each word under each intent in word level scores by intent 234 and then determine the top-K summed heatmap values. In another example, the words in top-K important words 310 may be shaded to visibly reflect importance or a summed heatmap value, with a most important word having a highest percentage of shading and a least important word having a lowest percentage of shading.

In the example the word "doors" 612 may reflect an abnormal word that ranks higher than expected for the intent of "turn_on" because training set 602 includes the phrases "lock my doors" and "shut my doors", as illustrated at reference numeral 604, as training data for the intent classification of "turn_on". In the example, a user viewing top-K important words 610 may view that the word "doors" is reflected as more important than expected and adjust training set 602 by decreasing the occurrence of the abnormal word "doors". By decreasing the occurrences of words in training data set 238 that are identified as abnormal words in top-K important words 610, and selecting to text classifier 102 with training data set 238 as updated, a user may mitigate potential prediction errors before deploying a trained classifier model.

In particular, in the example, while in the example of word-level heatmap 236 illustrated in FIG. 5, a user receives a visualized evaluation of the words in a testing phrase that most contributed to and least contributed to a label prediction, in order to quickly identify the problematic words in a particular testing phrase that result in a label prediction anomaly, in the example of top-k words heatmap 242 illustrated in FIG. 6, the user receives a visualized evaluation of the semantic related words in a training corpus that are most likely to result in a particular label prediction for a testing set, in order to quickly identify problematic words trained for a particular label.

Figure 7:
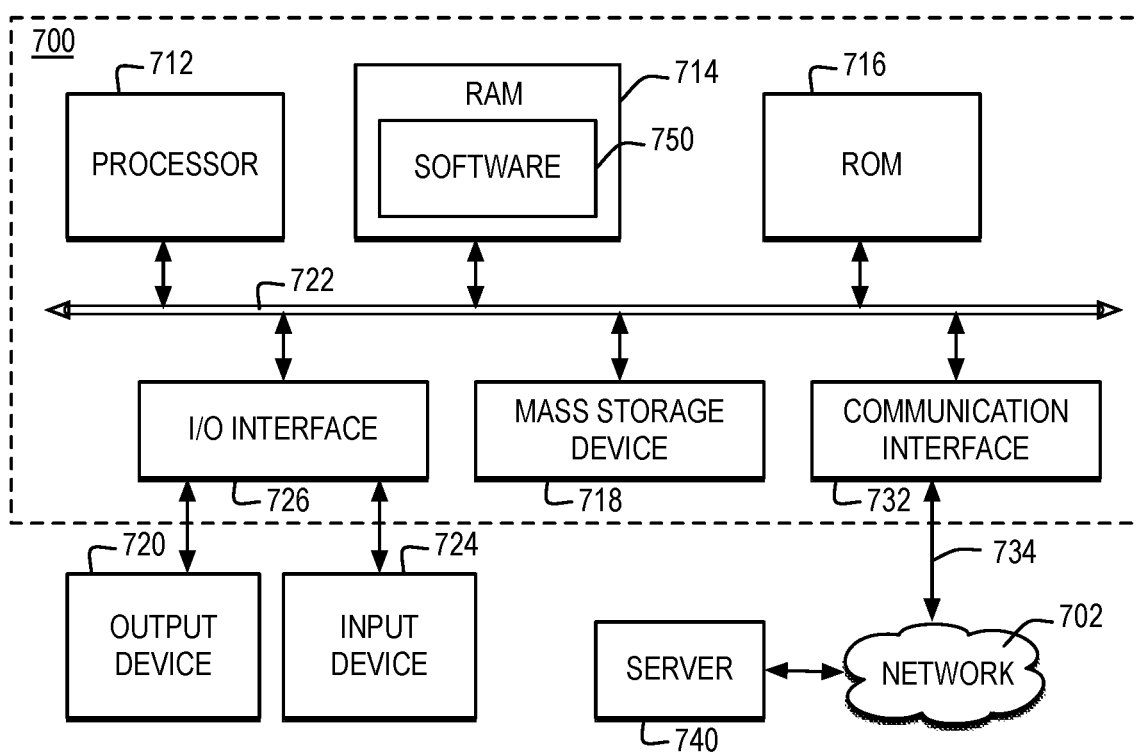
FIG. 7 illustrates one example of a computer system in which one embodiment of the invention may be implemented.

FIG. 7 illustrates a block diagram of one example of a computer system in which one embodiment of the invention may be implemented. The present invention may be performed in a variety of systems and combinations of systems, made up of functional components, such as the functional components described with reference to a computer system 700 and may be communicatively connected to a network, such as network 702.

Computer system 700 includes a bus 722 or other communication device for communicating information within computer system 700, and at least one hardware processing device, such as processor 712, coupled to bus 722 for processing information. Bus 722 preferably includes low-latency and higher latency paths that are connected by bridges and adapters and controlled within computer system 700 by multiple bus controllers. When implemented as a server or node, computer system 700 may include multiple processors designed to improve network servicing power.

Processor 712 may be at least one general-purpose processor that, during normal operation, processes data under the control of software 750, which may include at least one of application software, an operating system, middleware, and other code and computer executable programs accessible from a dynamic storage device such as random access memory (RAM) 714, a static storage device such as Read Only Memory (ROM) 716, a data storage device, such as mass storage device 718, or other data storage medium. Software 750 may include, but is not limited to, code, applications, protocols, interfaces, and processes for controlling one or more systems within a network including, but not limited to, an adapter, a switch, a server, a cluster system, and a grid environment.

Computer system 700 may communicate with a remote computer, such as server 740, or a remote client. In one example, server 740 may be connected to computer system 700 through any type of network, such as network 702, through a communication interface, such as network interface 732, or over a network link that may be connected, for example, to network 702.

In the example, multiple systems within a network environment may be communicatively connected via network 702, which is the medium used to provide communications links between various devices and computer systems communicatively connected. Network 702 may include permanent connections such as wire or fiber optics cables and temporary connections made through telephone connections and wireless transmission connections, for example, and may include routers, switches, gateways and other hardware to enable a communication channel between the systems connected via network 702. Network 702 may represent one or more of packet-switching based networks, telephony-based networks, broadcast television networks, local area and wire area networks, public networks, and restricted networks.

Network 702 and the systems communicatively connected to computer 700 via network 702 may implement one or more layers of one or more types of network protocol stacks which may include one or more of a physical layer, a link layer, a network layer, a transport layer, a presentation layer, and an application layer. For example, network 702 may implement one or more of the Transmission Control Protocol/Internet Protocol (TCP/IP) protocol stack or an Open Systems Interconnection (OSI) protocol stack. In addition, for example, network 702 may represent the world-wide collection of networks and gateways that use the TCP/IP suite of protocols to communicate with one another. Network 702 may implement a secure HTTP protocol layer or other security protocol for securing communications between systems.

In the example, network interface 732 includes an adapter 734 for connecting computer system 700 to network 702 through a link and for communicatively connecting computer system 700 to server 740 or other computing systems via network 702. Although not depicted, network interface 732 may include additional software, such as device drivers, additional hardware and other controllers that enable communication. When implemented as a server, computer system 700 may include multiple communication interfaces accessible via multiple peripheral component interconnect (PCI) bus bridges connected to an input/output controller, for example. In this manner, computer system 700 allows connections to multiple clients via multiple separate ports and each port may also support multiple connections to multiple clients.

In one embodiment, the operations performed by processor 712 may control the operations of flowchart of FIGS. 8-13 and other operations described herein. Operations performed by processor 712 may be requested by software 750 or other code or the steps of one embodiment of the invention might be performed by specific hardware components that contain hardwired logic for performing the steps, or by any combination of programmed computer components and custom hardware components. In one embodiment, one or more components of computer system 700, or other components, which may be integrated into one or more components of computer system 700, may contain hardwired logic for performing the operations of flowcharts in FIGS. 8-13.

In addition, computer system 700 may include multiple peripheral components that facilitate input and output. These peripheral components are connected to multiple controllers, adapters, and expansion slots, such as input/output (I/O) interface 726, coupled to one of the multiple levels of bus 722. For example, input device 724 may include, for example, a microphone, a video capture device, an image scanning system, a keyboard, a mouse, or other input peripheral device, communicatively enabled on bus 722 via I/O interface 726 controlling inputs. In addition, for example, output device 720 communicatively enabled on bus 722 via I/O interface 726 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 7, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 7 may vary. Furthermore, those of ordinary skill in the art will appreciate that the depicted example is not meant to imply architectural limitations with respect to the present invention.

Figure 8:
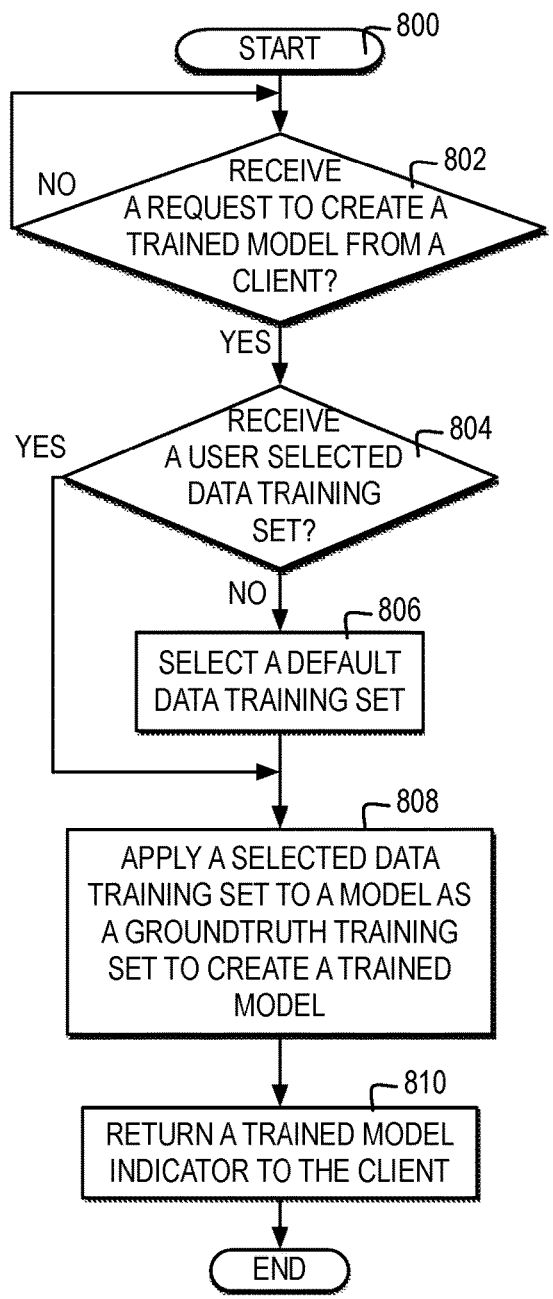
FIG. 8 illustrates a high-level logic flowchart of a process and computer program for creating and training a classifier model.

FIG. 8 illustrates a high-level logic flowchart of a process and computer program for creating and training a classifier model. In one example, the process and computer program start at block 800 and thereafter proceeds to block 802. Block 802 illustrates a determination whether a request to create a trained model is received from a client. At block 802, if a request to create a trained model is received from a client, then the process passes to block 804. Block 804 illustrates a determination whether a user selected data set is received. At block 804, if a user selected data set is received, then the process passes to block 808. At block 804, if no user selected data set is received, then the process passes to block 806. Block 806 illustrates selecting a default data training set, and the process passes to block 808.

Block 808 illustrates applying a selected data training set to a model as a ground truth training set to create a trained mode. Next, block 810 illustrates returning a trained model indicator to the client, and the process ends.

Figure 9:
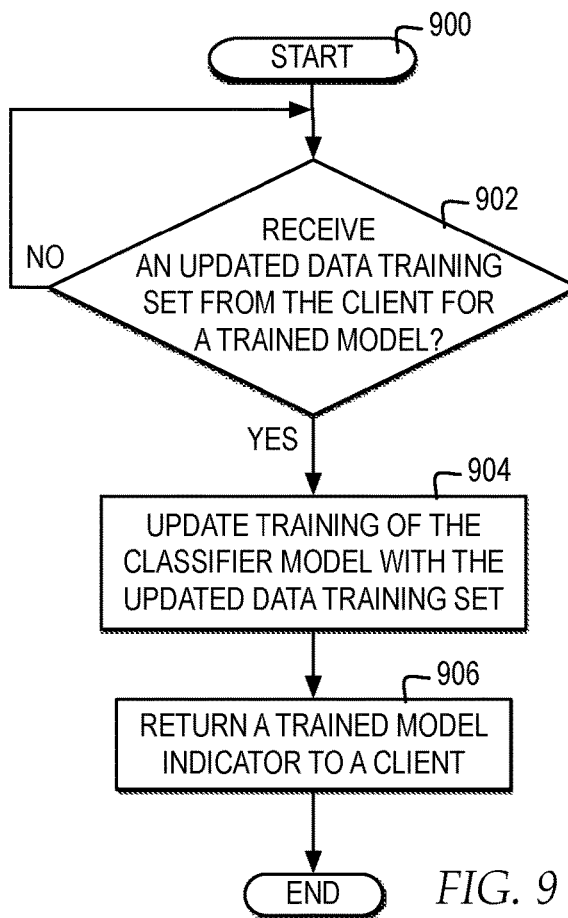
FIG. 9 illustrates a high-level logic flowchart of a process and computer program for updating a trained classifier model.

FIG. 9 illustrates a high-level logic flowchart of a process and computer program for updating a trained classifier model. In one example, the process and computer program start at block 900 and thereafter proceeds to block 902. Block 902 illustrates a determination whether an updated data training set is received from the client for a trained mode. At block 902, if an updated data training set is received from the client for a trained mode, then the process passes to block 904. Block 904 illustrates updating training of the classifier model with the updated data training set. Next, block 906 illustrates returning a trained model indicator to a client, and the process ends.

Figure 10:
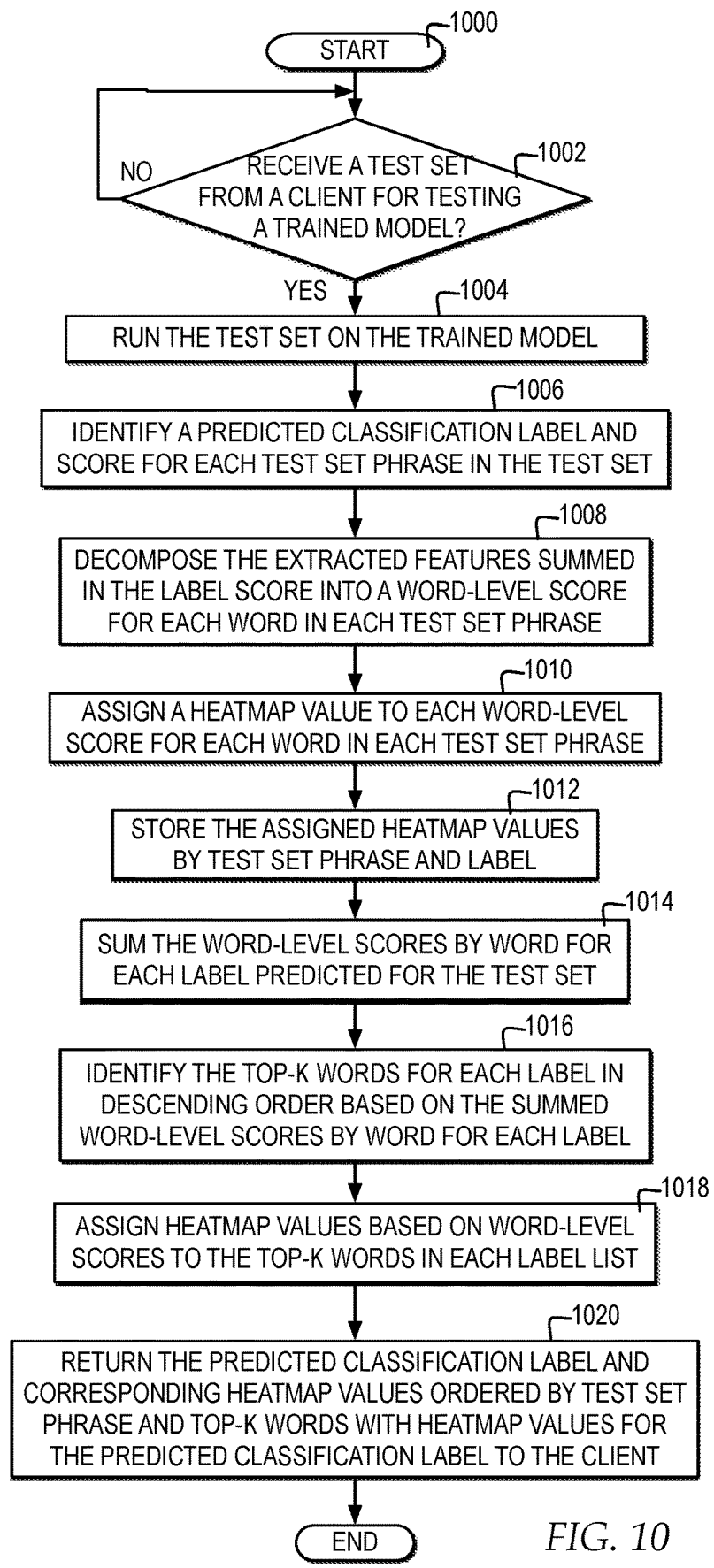
FIG. 10 illustrates a high-level logic flowchart of a process and computer program for analyzing predicted classifications to determine heatmap levels at a word-level that indicate word-level contributions to a predicted classification of a test phrase and to a classification label by a trained model.

FIG. 10 illustrates a high-level logic flowchart of a process and computer program for analyzing predicted classifications to determine heatmap levels at a word-level that indicate word-level contributions to a predicted classification of a test phrase and to a classification label by a trained model.

In the example, the process and computer program starts at block 1000 and thereafter proceeds to block 1002. Block 1002 illustrates a determination whether a testing set is received from a client for testing a trained model. At block 1002, if a testing set is received from a client for testing a trained model, then the process passes to block 1004. Block 1004 illustrates running the testing set on the trained model. Next, block 1006 illustrates identifying a predicted classification label and score for each testing set phrase in the testing set. Thereafter, block 1008 illustrates decomposing the extracted features summed in the label score into a word-level score for each word in each testing set phrase. Next, block 1010 illustrates assigning a heatmap value to each word-level score for each word in each testing set phrase. Thereafter, block 1012 illustrates storing the assigned heatmap values by testing set phrase and label. Next, block 1014 illustrates summing the word-level scores by word for each label predicted for the testing set. Thereafter, block 1016 illustrates identifying the top-k words for each label in descending order based on the summed word-level scores by word for each label. Next, block 1018 illustrates assigning heatmap values based on word-level scores to the top-k words in each label list. Thereafter, block 1020 illustrates returning the predicted classification label and corresponding heatmap values ordered by testing set phrase and top-k words with heatmap values for the predicted classification label to the client.

Figure 11:
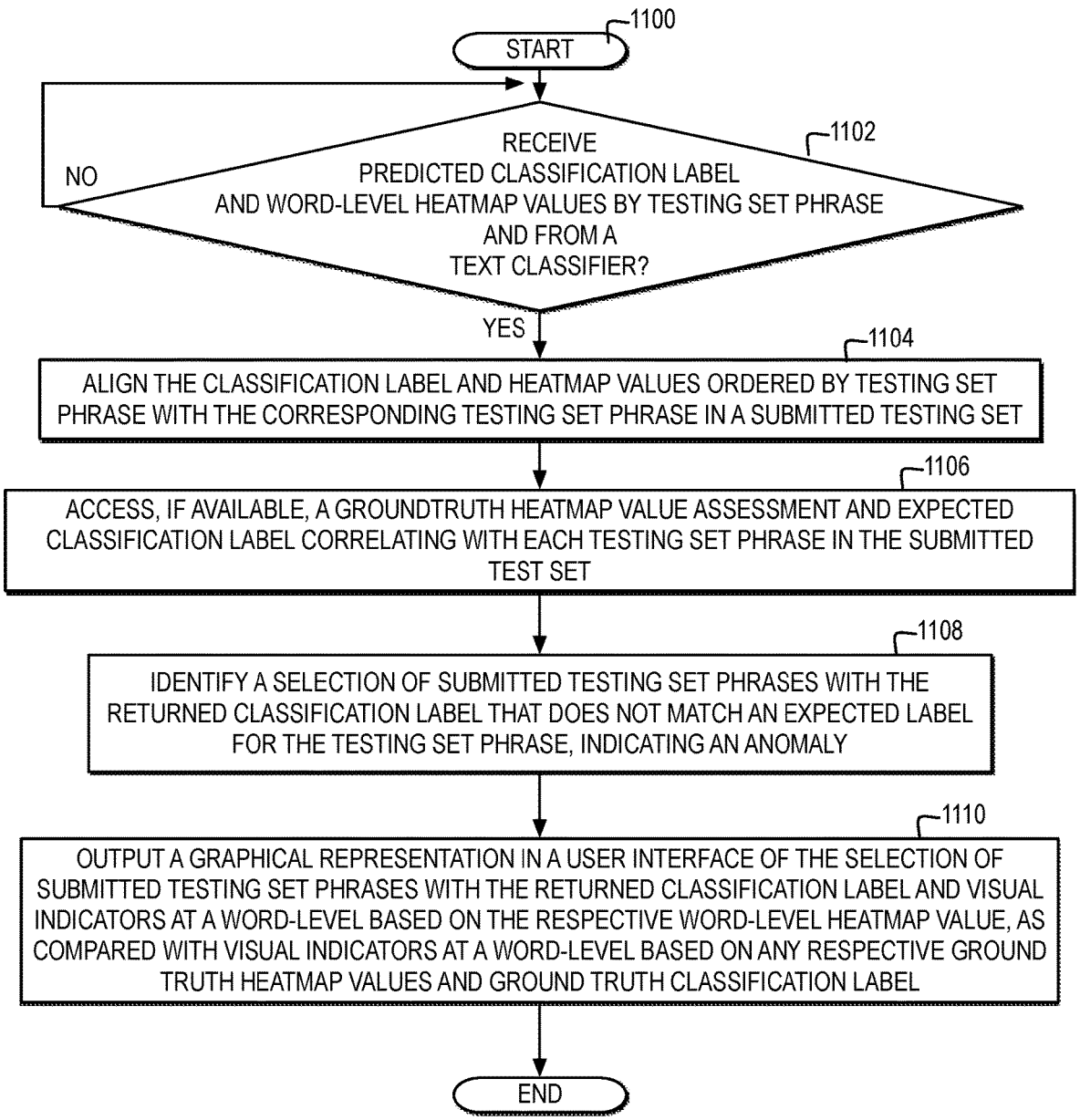
FIG. 11 illustrates a high-level logic flowchart of a process and computer program for outputting predicted classifications with visual indicators of impact to the predicted classification based on respective word-level heatmap levels most impacting a classification label.

FIG. 11 illustrates a high-level logic flowchart of a process and computer program for outputting predicted classifications with visual indicators of impact to the predicted classification based on respective word-level heatmap levels most impacting a classification label.

In one example, the process and computer program starts at block 1100 and thereafter proceeds to block 1102. Block 1102 illustrates a determination whether a predicted classification label and word-level heatmap values by testing set phrase is received from a text classifier. At block 1102, if a predicted classification label and word-level heatmap values by testing set phrase is received from a text classifier, then the process passes to block 1104. Block 1104 illustrates aligning the classification label and heatmap values ordered by testing set phrase with the corresponding testing set phrase in a submitted testing set. Next, block 1106 illustrates accessing, if available, a ground truth heatmap value assessment and expected classification label correlating with each testing set phrase in the submitted testing set. Thereafter, block 1108 illustrates identifying a selection of submitted testing set phrases with the returned classification label that does not match an expected label for the testing set phrase, indicating an anomaly. Next, block 1110 illustrates outputting a graphical representation in a user interface of the selection of submitted test phrases with the returned classification label and visual indicators at a word-level based on the respective-word level heatmap value, as compared with visual indicators at a word-level based on any respective ground truth heatmap values and ground truth classification label, and the process ends.

Figure 12:
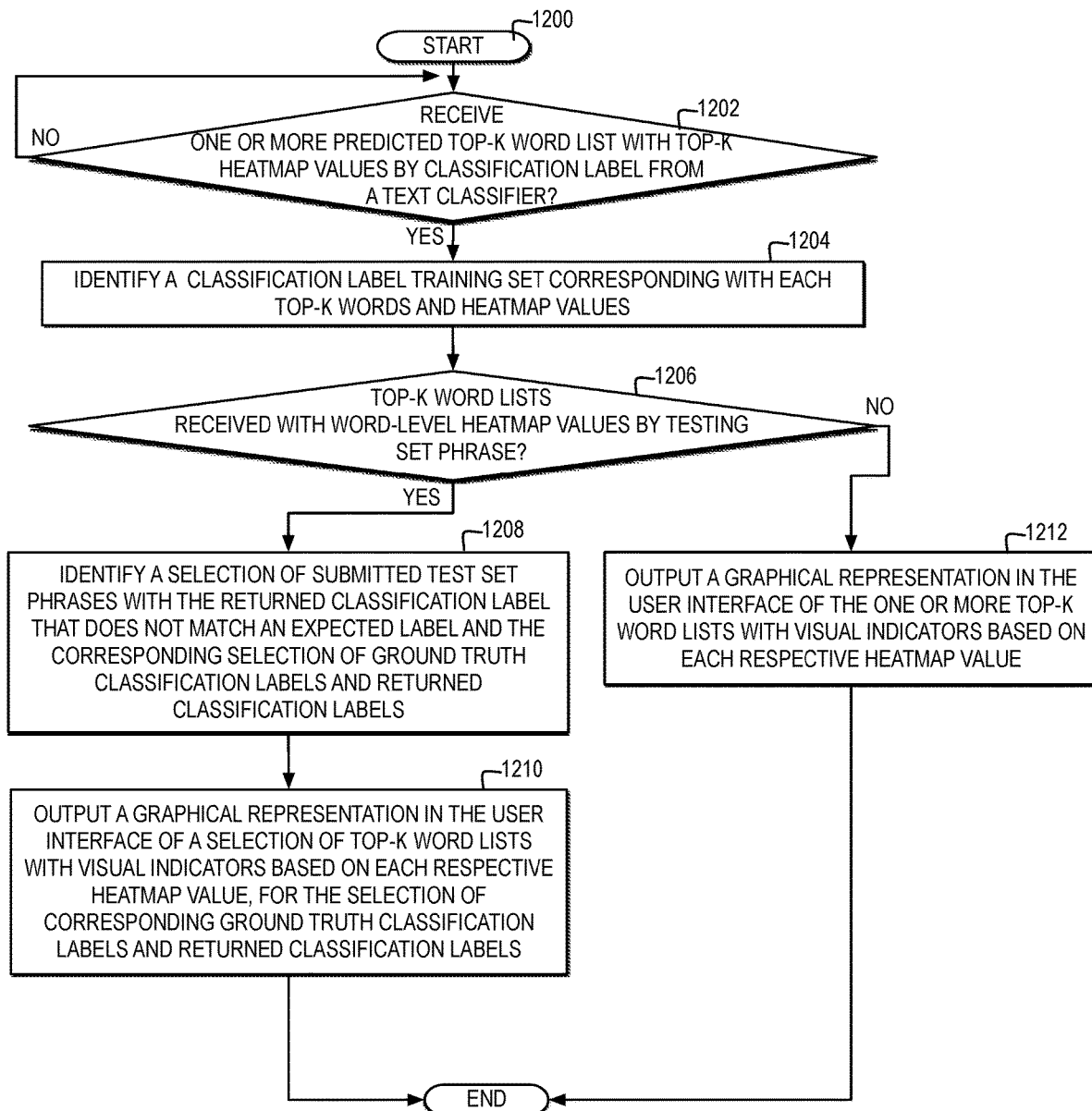
FIG. 12 illustrates a high-level logic flowchart of a process and computer program for outputting predicted classifications with visual indicators of impact to the predicted classification based on top-k word lists of words in a training set most impacting a classification label based on respective top-k heatmap levels.

FIG. 12 illustrates a high-level logic flowchart of a process and computer program for outputting predicted classifications with visual indicators of impact to the predicted classification based on top-k word lists of words in a training set most impacting a classification label based on respective top-k heatmap levels.

In one example, the process and program starts at block 1200 and thereafter proceeds to block 1202. Block 1202 illustrates a determination whether one or more predicted top-k word lists with top-k heatmap values by classification are received from a text classifier. At block 1202, if one or more predicted top-k word lists with top-k heatmap values by classification are received from a text classifier, the process passes to block 1204. Block 1204 illustrates identifying a classification label training set corresponding with each top-k words list and heatmap values for a classification label. Next, block 1206 illustrates a determination whether the top-k words lists are received with word-level heatmap values by testing set phrase.

At block 1206, if the top-k words lists are received with word-level heatmap values by testing set phrase, then the process passes to block 1208. Block 1208 illustrates identifying a selection of submitted testing set phrases with the returned classification label that does not match a ground truth classification label and the corresponding selection of ground truth classification labels and returned classification labels. Next, block 1210 illustrates outputting a graphical representation in the user interface of a selection of top-k word lists with visual indicators based on each respective heatmap value, for the selection of corresponding ground truth classification labels and returned classification labels, and the process ends.

Figure 13:
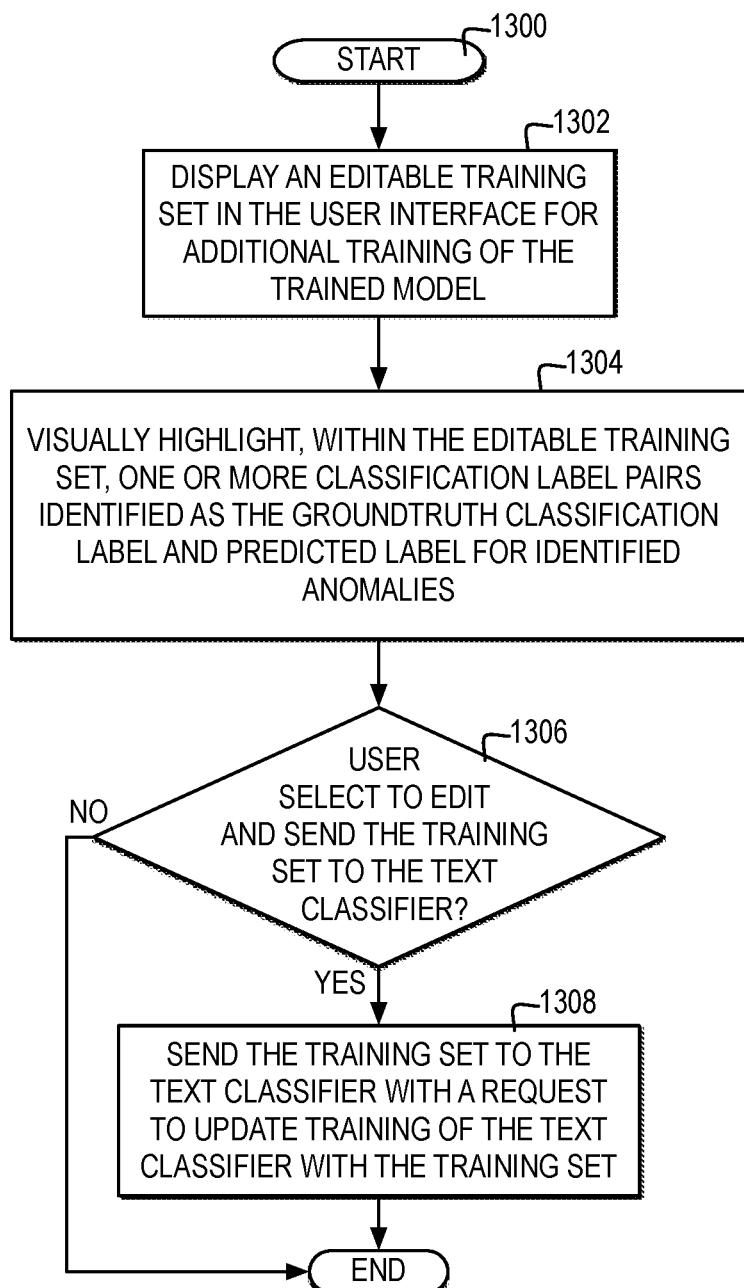
FIG. 13 illustrates a high-level logic flowchart of a process and computer program for supporting updated training of a text classifier highlighting classification label training for identified anomalies.

Returning to block 1206, if the top-k words lists are received with word-level heatmap values by testing set phrase, then the process passes to block 1212. Next, block 1212 illustrates outputting a graphical representation in the user interface of the one or more top-k word lists with visual indicators based on each respective heatmap value, and the process ends FIG. 13 illustrates a high-level logic flowchart of a process and computer program for supporting updated training of a text classifier highlighting classification label training for identified anomalies.

In one example, the process and computer program starts at block 1300 and thereafter proceeds to block 1302. Block 1302 illustrates displaying an editable training set in the user interface for additional training of the trained model. Next, block 1304 illustrates visually highlighting, within the editable training set, one or more classification labels pairs identifies as the groundtruth classification label and predicted label for identified anomalies. Thereafter, block 1306 illustrates a determination whether the user selects to edit and send the training set to the text classifier. At block 1306, if the user selects to edit and send the training set to the text classifier, then the process passes to block 1308. Block 1308 illustrates sending the training set to the text classifier with a request to update training of the text classifier with the training set, and the process ends.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method comprising:
   submitting, by a computer system, a plurality of testing phrases to a text classifier, each of the testing phrases comprising a plurality of words, the text classifier trained to predict a label for each submitted test phrase, the text classifier trained to calculate a word-level score for the label based on an extracted feature of each respective word within each submitted test phrase and assign a heatmap value to reflect a relative weight of each word-level score;
   receiving, by the computer system, from the text classifier, a plurality of classification labels each comprising one or more respective heatmap values each associated with a separate word within a separate one of the plurality of testing phrases, each of the one or more respective heatmap values reflecting the respective relative weight of a respective word-level score of a respective extracted feature of the separate word;
   aligning, by the computer system, each of the plurality of classification labels and one or more respective heat map values with a respective testing phrase of the plurality of testing phrases;
   accessing, by the computer system, a separate groundtruth heatmap value assessment and expected classification label correlating with each respective testing phrase of the plurality of testing phrases;
   identifying, by the computer system, one or more anomalies of a selection of one or more classification labels of the plurality of classification labels that are different from the expected classification label for each respective testing phrase from among the plurality of testing phrases; and
   outputting, by the computer system, a graphical representation in a user interface of the selection of one or more classification labels and one or more respective testing phrases with visual indicators based on one or more respective heatmap values by each word in the one or more respective testing phrases to identify the contribution of each word to the respective classification label, as compared with one or more visual indicators at a word-level based on the separate groundtruth heatmap value assessment and expected classification label.

2. The method according to claim 1, wherein submitting, by a computer system, a plurality of testing phrases to a text classifier further comprises:
   submitting, by the computer system, the plurality of testing phrases of the text classifier trained by applying a training set of a plurality of testing phrases.

3. The method according to claim 1, wherein receiving, by the computer system, from the text classifier, a plurality of classification labels each comprising one or more heatmap values each associated with a separate word within a separate one of the plurality of testing phrases, each of the one or more respective heatmap values reflecting the respective relative weight of a respective word-level score of a respective extracted feature of the separate word further comprises:
   receiving, by the computer system, from the text classifier, the plurality of classification labels each comprising the one or more heatmap values each associated with the separate word from the text classifier, wherein the text classifier, in response to running at least one testing phrase on a previously trained text classifier and identifying a separate predicted classification label based on a score calculated for each respective at least one testing phrase, decomposes a plurality of extracted features summed in the score into a plurality of word-level scores for each word in the at least one testing phrase and assigns the separate heatmap value to each of the plurality of word-level scores, each respective separate heatmap value reflecting a weight of each word-level score of the plurality of word-level scores.

4. The method according to claim 1, further comprising:
   displaying, by the computer system, within the user interface, an editable training set of one or more training phrases; and
   visually highlighting, by the computer system, within the editable training set, the selection of one or more classification labels identified as the one or more anomalies.

5. The method according to claim 1, further comprising:
   receiving, by the computer system, from the text classifier, with each separate predicted classification label, a list of a top selection of words from among a plurality of words in descending order from a highest summed score by word based on summed word-level scores by word; and
   outputting, by the computer system, in the user interface, each separate predicted classification label, the one or more respective heatmap values, and the list of the top selection of words for each respective separate predicted classification label.

* * * * *